(12) United States Patent
Valentine et al.

(10) Patent No.: US 6,449,478 B1
(45) Date of Patent: Sep. 10, 2002

(54) SYSTEM AND METHOD FOR MODIFICATION OF SATELLITE HOP COUNTER TO REFLECT ORBIT TYPE

(75) Inventors: Eric Valentine, Plano; Lee Davidson, McKinney, both of TX (US)

(73) Assignee: Ericsson Inc., Research Triangle Park, NC (US)

( * ) Notice: Subject to any disclaimer, the term of this patent is extended or adjusted under 35 U.S.C. 154(b) by 0 days.

(21) Appl. No.: 09/306,562

(22) Filed: May 6, 1999

(51) Int. Cl.[7] .................................................. H04Q 7/20
(52) U.S. Cl. ........................ 455/430; 455/427; 455/428
(58) Field of Search ................................. 455/427, 428, 455/430, 12.1, 13.1, 445; 370/316, 236, 238; 342/356, 357.01, 357.11

(56) References Cited

U.S. PATENT DOCUMENTS

| | | | | |
|---|---|---|---|---|
| 4,769,815 A | * | 9/1988 | Hinch et al. ................ | 370/236 |
| 5,317,566 A | * | 5/1994 | Joshi .......................... | 370/238 |
| 5,857,009 A | * | 1/1999 | Handig ....................... | 379/32.1 |
| 5,884,142 A | * | 3/1999 | Wiederman et al. ........ | 455/12.1 |
| 5,930,254 A | * | 7/1999 | Liron et al. ................. | 370/395 |
| 6,072,430 A | * | 6/2000 | Wyrwas et al. ........ | 342/357.01 |
| 6,078,810 A | * | 6/2000 | Olds et al. .................. | 455/12.1 |
| 6,114,992 A | * | 9/2000 | Underbrink ............ | 342/357.15 |
| H1941 H | * | 2/2001 | Hoffpauir et al. ........... | 379/265 |
| 6,185,407 B1 | * | 2/2001 | Watson .......................... | 455/9 |
| 6,195,553 B1 | * | 2/2001 | Claffery et al. ............. | 455/445 |
| 6,208,625 B1 | * | 3/2001 | Zancho et al. .............. | 370/316 |

* cited by examiner

Primary Examiner—Dwayne Bost
Assistant Examiner—Sonny Trinh
(74) Attorney, Agent, or Firm—Jenkens & Gilchrist, P.C.

(57) ABSTRACT

A telecommunications system and method is disclosed for providing a more accurate measurement of the cumulative path delay present in a call to enable switches to make an informed decision as to the routing method to use. In one embodiment, the Integrated Services Digital Network User Part (ISUP) satellite hop counter field is expanded to include three fields, one for each type of delay: geostationary satellite hops, mid-earth orbit satellite hops and low-earth orbit satellite hops. In an alternative embodiment, a cumulative delay value in milliseconds or centiseconds, instead of the number of satellite hops, can be included in the expanded ISUP satellite hop counter field.

14 Claims, 7 Drawing Sheets

OCTET 1

| H | G | F | E | D | C | B | A | — 255

257 (under B A)

| BA | Satellite Indicator |
| --- | --- |
| 00 | No satellite circuit in the connection |
| 01 | One satellite circuit in the connection |
| 10 | Two satellite circuits in the connection |
| 11 | Three or more satellite circuits in the connection |
| DC | Continuity Check Indicator |
| E | Echo Control Device Indicator |
| HGF | Spare |

*FIG. 3*

OCTET 1

| H | G | F | E | D | C | B | A | — 255 |

257 (B, A bracket), 256 (A)

| A | Satellite Indicator |
|---|---|
| 0 | No satellite delay information present |
| 1 | Satellite delay information present |
| B | Spare |

*FIG. 4A*

OCTET 2

257 { | H | G | F | E | D | C | B | A | — 258

253 (HGF), 252 (ED), 251 (CBA)

| CBA | LEO Satellite Indicator |
|---|---|
| 000 | No LEO satellite delay present |
| 001 | One LEO satellite hop |
| ⋮ | |
| 111 | Seven or more LEO satellite hops |
| ED | MEO Satellite Indicator |
| 00 | No MEO satellite delay present |
| 01 | One MEO satellite hop |
| ⋮ | |
| 11 | Three or more MEO satellite hops |
| HGF | GEO Satellite Indicator |
| 000 | No GEO satellite delay present |
| 001 | One GEO satellite hop |
| ⋮ | |
| 111 | Seven or more GEO satellite hops |

SYSTEM AND METHOD FOR MODIFICATION OF SATELLITE HOP COUNTER TO REFLECT ORBIT TYPE

BACKGROUND OF THE PRESENT INVENTION

Field of the Invention

The present invention relates generally to telecommunications systems and methods for connecting calls through a satellite network, and specifically to monitoring delay time from connecting calls over a satellite network.

BACKGROUND AND OBJECTS OF THE PRESENT INVENTION

Cellular telecommunications is one of the fastest growing and most demanding telecommunications applications ever. Today it represents a large and continuously increasing percentage of all new telephone subscriptions around the world. A standardization group, Global System for Mobile Communication (GSM), was established in 1982 to formulate the specifications for mobile cellular radio systems.

Figure 1:
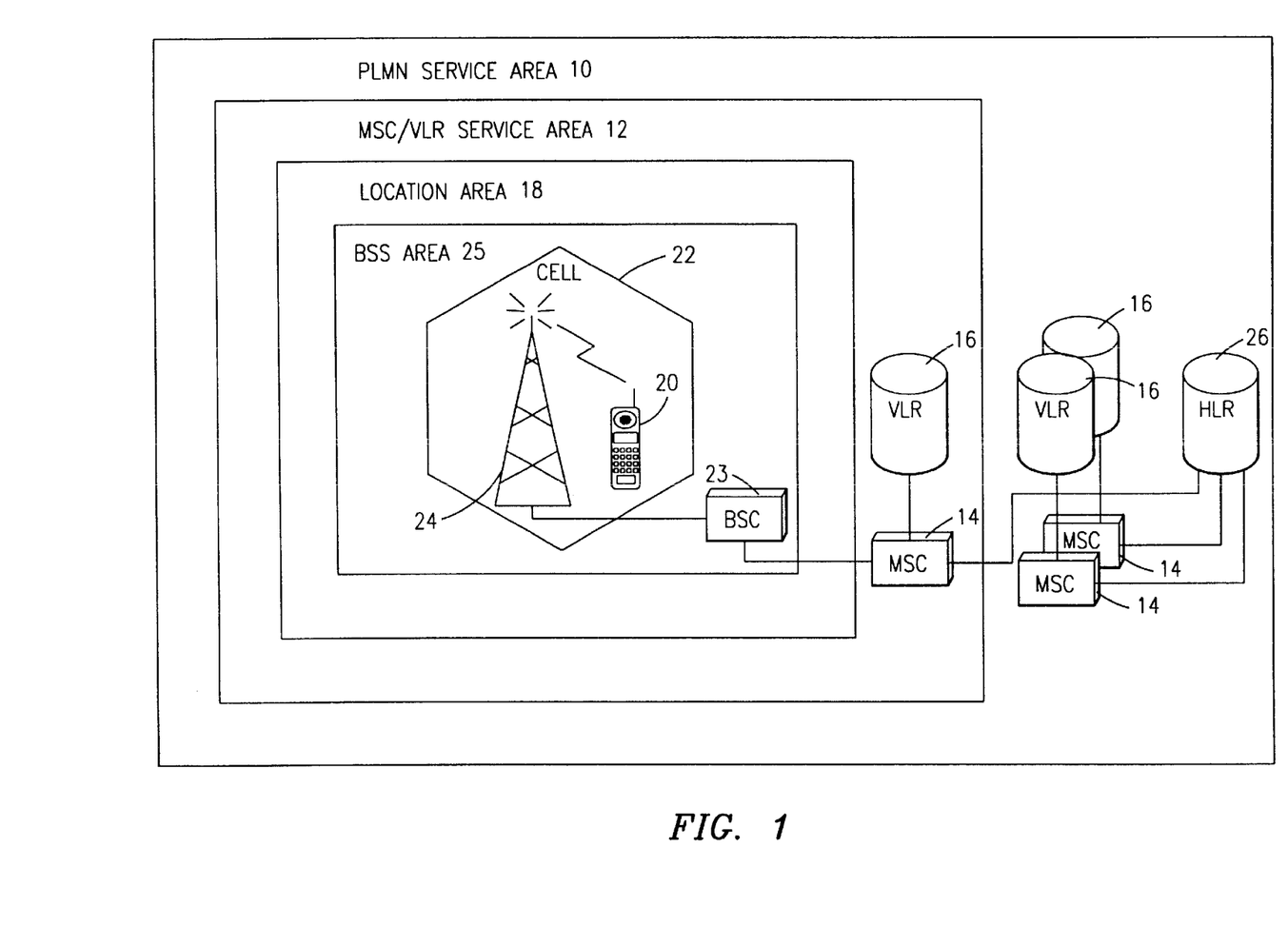
FIG. 1 is a block diagram of a conventional terrestrially-based wireless telecommunications system.

With reference now to FIG. 1 of the drawings, there is illustrated a GSM Public Land Mobile Network (PLMN), such as cellular network 10, which in turn is composed of a plurality of areas 12, each with a Mobile Switching Center (MSC) 14 and an integrated Visitor Location Register (VLR) 16 therein. The MSC/VLR areas 12, in turn, include a plurality of Location Areas (LA) 18, which are defined as that part of a given MSC/VLR area 12 in which a Mobile Station (MS) 20 may move freely without having to send update location information to the MSC/VLR area 12 that controls the LA 18. Each Location Area 12 is divided into a number of cells 22. MS 20 is the physical equipment, e.g., a car phone or other portable phone, used by mobile subscribers to communicate with the cellular network 10, each other, and users outside the subscribed network, both wireline and wireless.

The MSC 14 is in communication with at least one Base Station Controller (BSC) 23, which, in turn, is in contact with at least one Base Transceiver Station (BTS) 24. The BTS 24 is the physical equipment, illustrated for simplicity as a radio tower, that provides radio coverage to the geographical part of the cell 22 for which it is responsible. It should be understood that the BSC 23 may be connected to several BTSs 24, and may be implemented as a stand-alone node or integrated with the MSC 14. In either event, the BSC 23 and BTS 24 components, as a whole, are generally referred to as a Base Station System (BSS) 25.

With further reference to FIG. 1, the PLMN Service Area or cellular network 10 includes a Home Location Register (HLR) 26, which is a database maintaining all subscriber information, e.g., user profiles, current location information, International Mobile Subscriber Identity (IMSI) numbers, and other administrative information. The HLR 26 may be co-located with a given MSC 14, integrated with the MSC 14, or alternatively can service multiple MSCs 14, the latter of which is illustrated in FIG. 1.

The VLR 16 is a database containing information about all of the MSs 20 currently located within the MSC/VLR area 12. If an MS 20 roams into a new MSC/VLR area 12, the VLR 16 connected to that MSC 14 will request data about that MS 20 from the HLR database 26 (simultaneously informing the HLR 26 about the current location of the MS 20). Accordingly, if the user of the MS 20 then wants to make a call, the local VLR 16 will have the requisite identification information without having to reinterrogate the HLR 26. In the aforedescribed manner, the VLR and HLR databases 16 and 26, respectively, contain various subscriber information associated with a given MS 20.

It should be understood that the aforementioned system 10, illustrated in FIG. 1, is a terrestrially-based system. In addition to the terrestrially-based systems, there are a number of satellite systems, which work together with the terrestrially-based systems to provide cellular telecommunications to a wider network of subscribers. This is due to the fact that the high altitude of the satellite makes the satellite visible (from a radio perspective) from a wider area on the earth. The higher the satellite, the larger the area that the satellite can communicate with.

Figure 2:
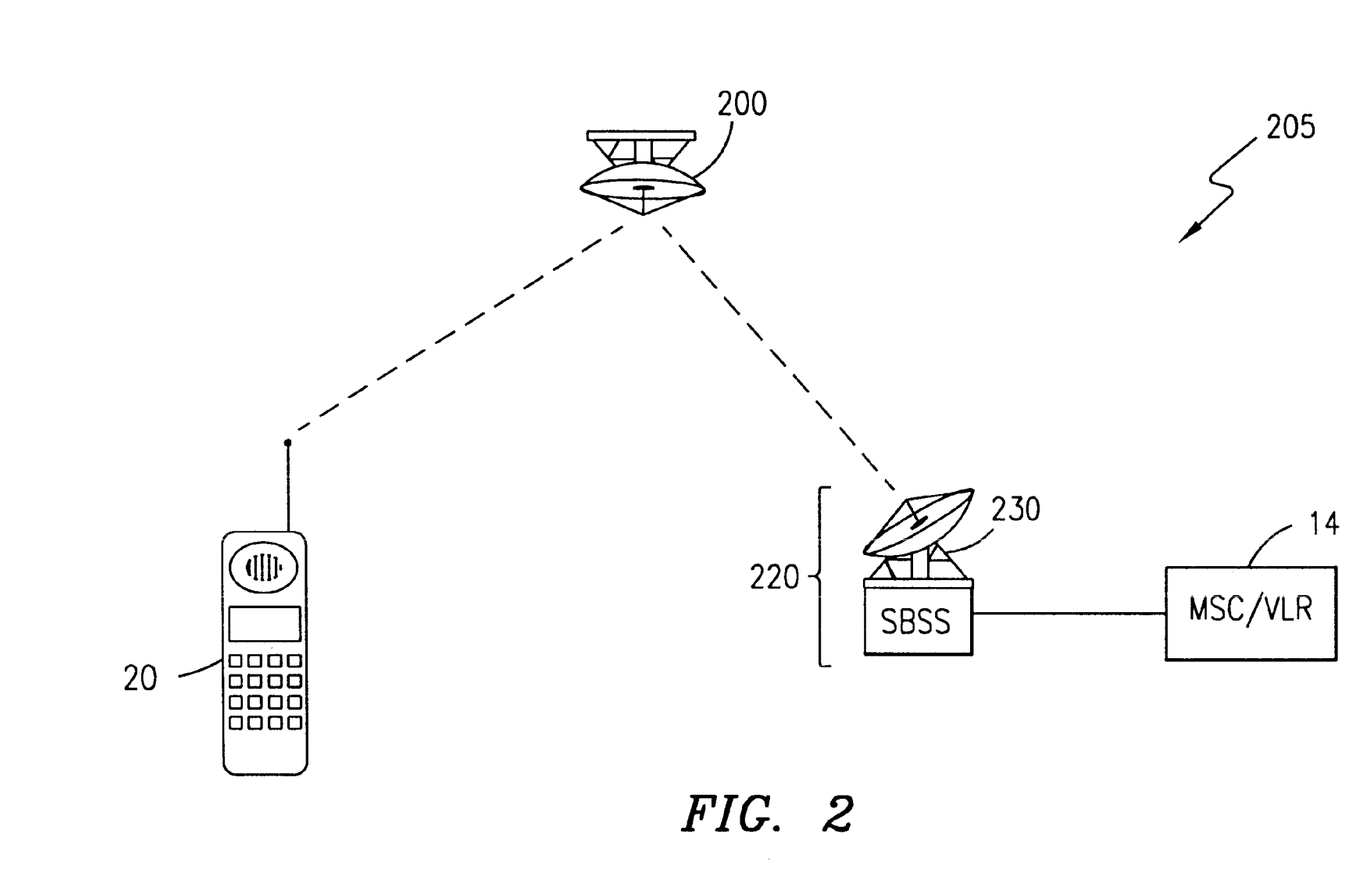
FIG. 2 is a block diagram of a conventional satellite network.

Within a satellite-based network 205, as shown in FIG. 2 of the drawings, a system of satellites 200 in orbit are used to provide communication between MSs 20 and a satellite-adapted Base Station System (SBSS) 220, which is connected to an MSC 14. The MS 20 communicates via one of the satellites 200 using a radio air interface, for instance, based on the Time Division Multiple Access (TDMA) or Code Division Multiple Access (CDMA). The satellite 200 in turn communicates with one or more SBSSs 220, which consist of equipment for communicating with the satellites 200 and through the satellites 200 to the MSs 20. The antennae and satellite tracking part of the system is the Radio Frequency Terminal (RFT) subsystem 230, which also provides for the connection of the communication path to the satellite 200.

There are currently three different types of satellite systems in place, each having satellites at a different orbit. One type of satellite system is a geostationary (GEO) satellite system, in which the GEO satellites orbit at 36,000 kilometers (km). GEO satellites are often used today for transmission between switches, such as on transatlantic routes. Another type of satellite system is a mid-earth orbit (MEO) system, such as the ICO Global Communications network, in which the MEO satellites orbit at around 10,000 km. The last type of satellite system is a low-earth orbit (LEO) system, such as the Irridium system, in which the LEO satellites orbit at around 100–1,000 km.

During any given call, a number of satellite "hops" or connections may be made in order to efficiently complete the call. For example, if a calling MS 20 is located in Asia, while the called MS 20 is located in the United States, there may be several satellite hops involved because the same satellite 200 would not be able to cover both Asia and the United States. In making a decision as to whether to route the call via satellite 200 or through normal trunk lines, a switch, such as an MSC 14, that has received the call typically considers the traffic load, the call type cost for use of the link (satellite or trunk) and the amount of delay that has already accumulated in the call up to that point. The majority of this delay may be due to previous satellite hops. This is due to the fact that each time a call is routed through a satellite 200, there is a resulting propagation delay in the signal. If the accumulated delay is minimal, the MSC 14 may choose to route the call via a satellite 200. However, if the accumulated delay is large, the MSC 14 may decide to route the call through normal trunk lines in order to maintain signal quality.

In order to enable switches to make routing decisions, this delay information is transmitted to the switches in a satellite hop counter field of an Integrated Services Digital Network User Part (ISUP) message. The ISUP message is used to establish connections between switches during call setup.

Currently, the satellite hop counter field is incremented based upon the number of GEO satellite hops, in which each hop presupposes a 250 millisecond (ms) delay. Applying the same incrementation method to LEO and MEO satellite hops incorrectly identifies the delay. For example, the Irridium network has the capability to switch traffic between satellites, and thus, several satellite hops may be involved, even though only one satellite hop is recorded.

In addition, a typical MEO delay is approximately 67 ms. It is unclear whether this delay should be counted as a one or as a zero. If it is counted as a zero, and there are four MEO satellite hops in the connection, which is the equivalent of a GEO delay, the counter will not indicate any delay, which is clearly inaccurate. However, if the delay is counted, the counter will indicate a delay of over one second for the four hops, which is also inaccurate. In either case, routing decisions will be made based upon inaccurate delay information.

Furthermore, the satellite hop counter field has been used to generically indicate a delay in the call. This delay can be caused by things other than a satellite hop. For example, Digital Speech Processors within the MSs 20 can cause a delay. Thus, the satellite hop counter may be incremented by one, even if no satellites have been used to make the connection. Therefore, important routing decisions may be made based upon inaccurate and misleading delay information.

It is, therefore, an object of the present invention to provide a more accurate measurement of the cumulative path delay present in a call to enable switches to make an informed decision as to the routing method to use.

SUMMARY OF THE INVENTION

The present invention is directed to telecommunications systems and methods for providing a more accurate measurement of the cumulative path delay present in a call to enable switches to make an informed decision as to the routing method to use. In one embodiment, the ISUP satellite hop counter field is expanded to include three fields, one for each type of delay: GEO satellite hops, MEO satellite hops and LEO satellite hops. In an alternative embodiment, a cumulative delay value in milliseconds or centiseconds, instead of the number of satellite hops, can be included in the expanded ISUP satellite hop counter field.

BRIEF DESCRIPTION OF THE DRAWINGS

The disclosed invention will be described with reference to the accompanying drawings, which show important sample embodiments of the invention and which are incorporated in the specification hereof by reference, wherein.

DETAILED DESCRIPTION OF THE PRESENTLY PREFERRED EXEMPLARY EMBODIMENTS

The numerous innovative teachings of the present application will be described with particular reference to the presently preferred exemplary embodiments. However, it should be understood that this class of embodiments provides only a few examples of the many advantageous uses of the innovative teachings herein. In general, statements made in the specification of the present application do not necessarily delimit any of the various claimed inventions. Moreover, some statements may apply to some inventive features but not to others.

In order to establish a call connection between a calling party and a called party, an Integrated Services Digital Network User Part (ISUP) message is transmitted between switches, such as Mobile Switching Centers (MSCs), to establish trunk or satellite connections between the switches. Each time the ISUP message reaches a new switch in the network, that switch must determine the best possible path for routing the call. Call routing is a tradeoff between cost and quality. Cost is typically dependent upon agreements between carriers. However, quality depends largely on the amount of propagation delay, or the lack thereof, that the call has experienced so far. In many cases, the majority of the delay is directly related to the number of satellite hops (or satellite circuits) in the connection. Therefore, satellite hop counter information is typically included in the ISUP message.

Figure 3:
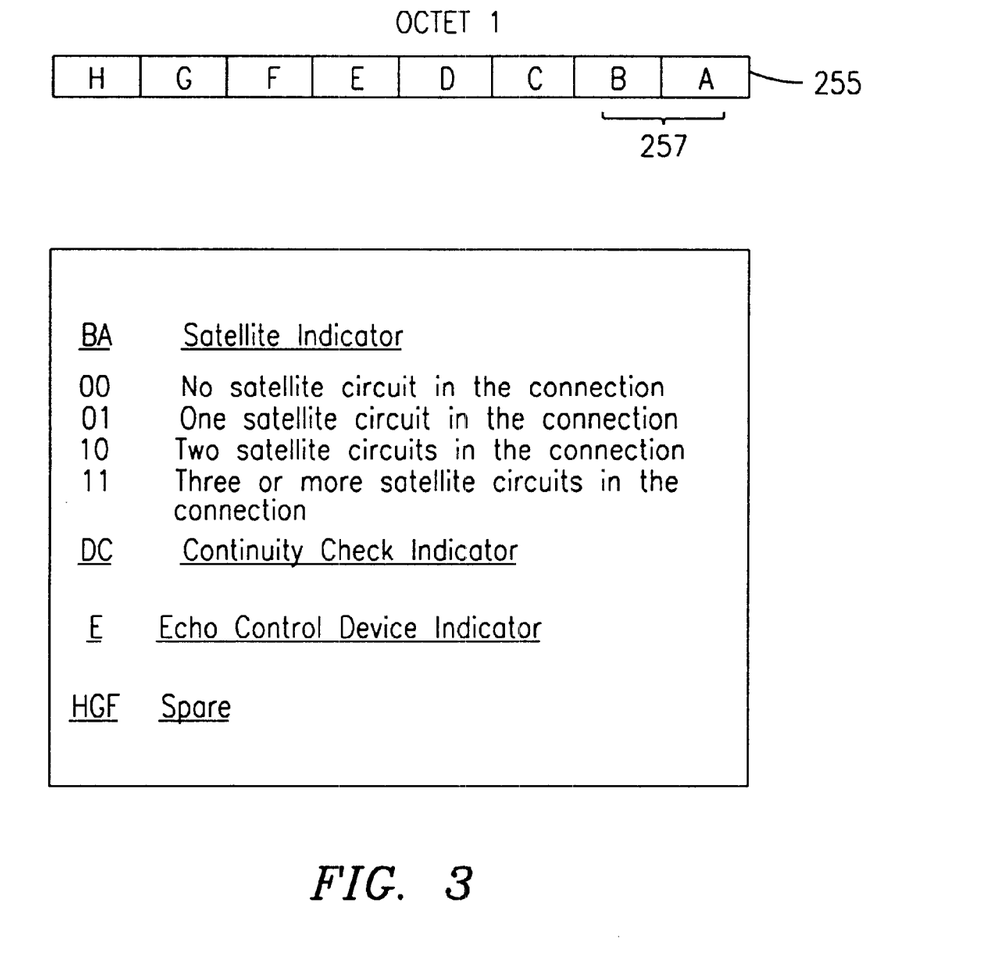
FIG. 3 illustrates a conventional satellite hop counter field in an ISUP message.

With reference now to FIG. 3 of the drawings, a sample structure of an octet 255 of an ISUP message, which has a satellite hop counter field 257 therein, is shown. As can be seen, bits A and B provide the satellite hop counter information 257, while bits C–H provide additional information not related to the satellite hop counter information 257. There are four possible designations of the combination of bits A and B, depending upon whether bits A and B have a "1" or a "0" associated therewith. For example, if bits A and B are both set to zero, then there is not a satellite circuit in the connection, and thus the connection delay is minimal. However, if bits A and B are both set to one, then there are three or more satellite circuits in the connection, and thus a significant delay is present in the connection.

As stated before, the satellite hop counter 257 is incremented each time a satellite hop is encountered, regardless of the type of satellite network used, e.g., geostationary (GEO), low-earth orbit (LEO) or mid-earth orbit (MEO). When the switch receives the satellite hop counter field 257, an assumption is made that each satellite hop is a GEO satellite hop, which indicates a delay of 250 milliseconds (ms). However, with the increased usage of MEO and LEO satellite networks, this assumption is no longer correct, resulting in inaccurate delay information. Therefore, the switch may route the message over trunk lines even though a satellite connection could have been used. In many cases, satellite connections can provide a more cost-effective routing path because the satellite connection may bypass intermediate service providers. Thus, routing the call over trunk lines may increase the cost of the call.

Figure 4A:
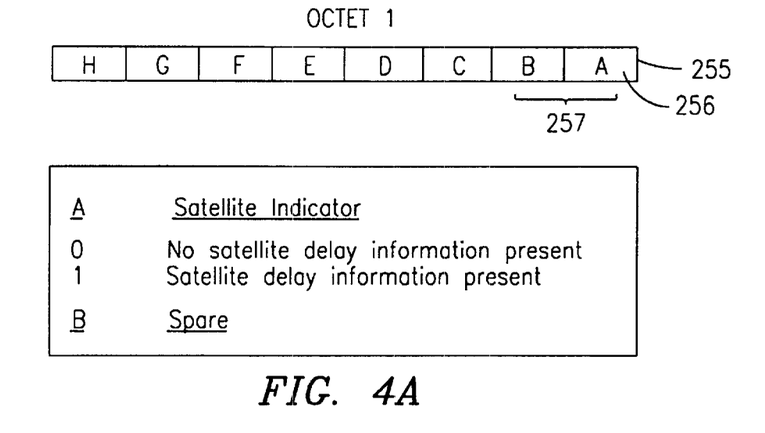
FIGS. 4A and 4B illustrate an expanded satellite hop counter field containing the number of satellite.hops per orbit type in order to provide more accurate delay information in accordance with preferred embodiments of the present invention.
Figure 4B:
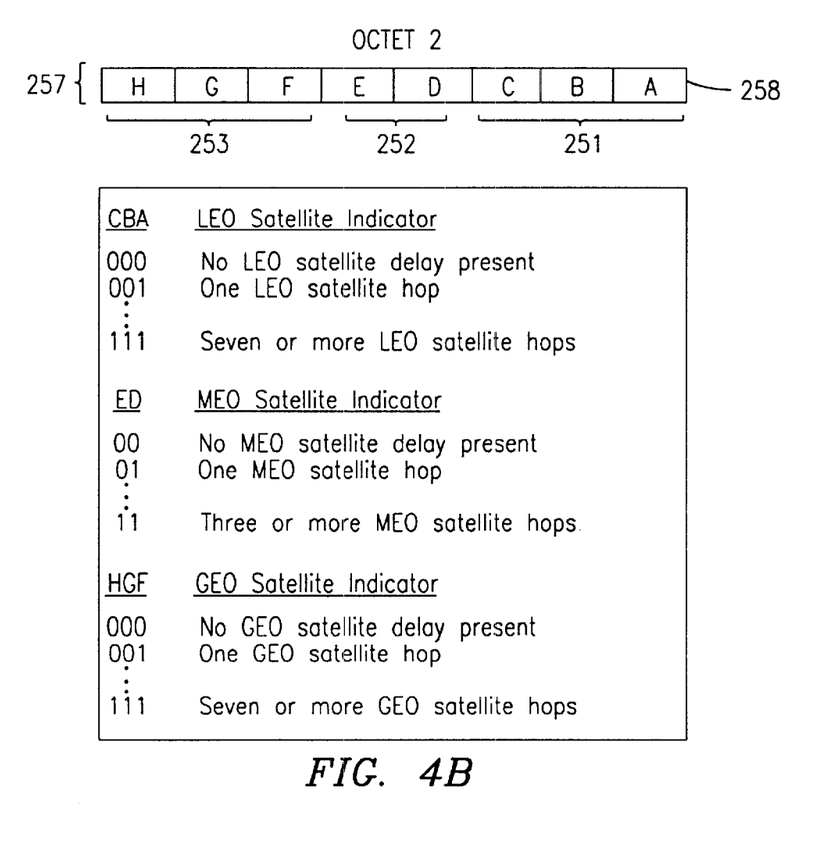

Therefore, in accordance with embodiments of the present invention, the satellite hop counter field 257 in the ISUP message can be expanded to include a more accurate measurement of the cumulative path delay present in a call to enable switches to make an informed decision as to the routing method to use. In one embodiment of the present invention, as shown in FIGS. 4A and 4B of the drawings, the ISUP satellite hop counter field 257 is expanded to include an additional octet 258, containing three additional fields. The first octet 255 corresponds to the octet 255 shown in FIG. 3 of the drawings. However, only the A bit is now used as a satellite delay indicator 256 to indicate whether or not satellite delay information is available. The B bit becomes a spare bit. Thus, if the A bit is set to zero, then no satellite delay information is present, and the switch would not need to look for the second octet 258. However, if the A bit is set to one, then satellite delay information is present, and the switch would need to look for the second octet 258 to obtain the delay information.

If the second octet 258 is included (delay information is present), the switch can more accurately determine the delay by examining the designation of "1" or "0" in each of the bits A–H. Bits A–C constitute a LEO field 251, which indicates the number of LEO satellite hops present in the connection, bits D–E constitute a MEO field 252, which indicates the number of MEO satellite hops and bits F–H constitute a GEO field 253, which represents the number of GEO satellite hops present in the connection. When the number of LEO satellite hops becomes seven or more, bits A, B and C of the LEO field 251 are all set to one. Once the number of LEO satellite hops reaches the equivalent of a MEO satellite hop, which is usually around ten LEO satellite hops, the LEO field 251 is zeroed (bits A–C are set to zero), and the MEO field 252 is incremented by one. Once the number of MEO satellite hops reaches the equivalent of a GEO satellite hop, which is approximately three or four MEO satellite hops, the MEO satellite field 252 is zeroed (bits D and E are set to zero), and the GEO field 253 is incremented by one.

Figure 5A:
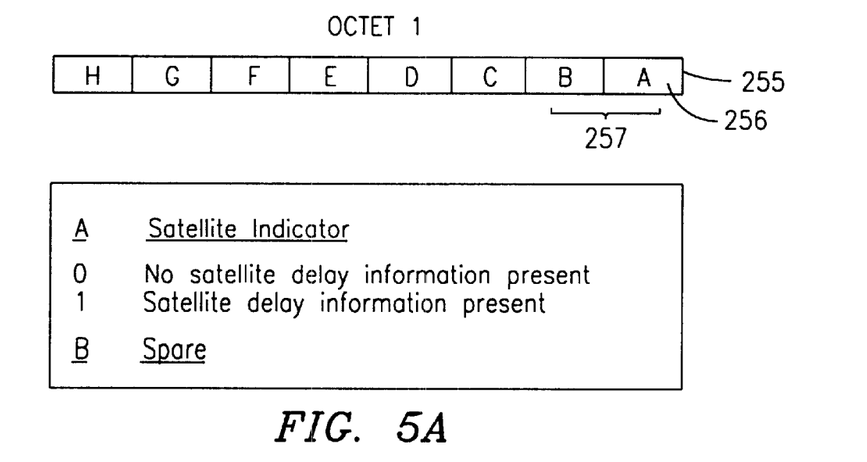
FIGS. 5A and 5B illustrate an alternative embodiment of the present invention, in which actual estimated delay information is included within the expanded satellite hop counter field.
Figure 5B:
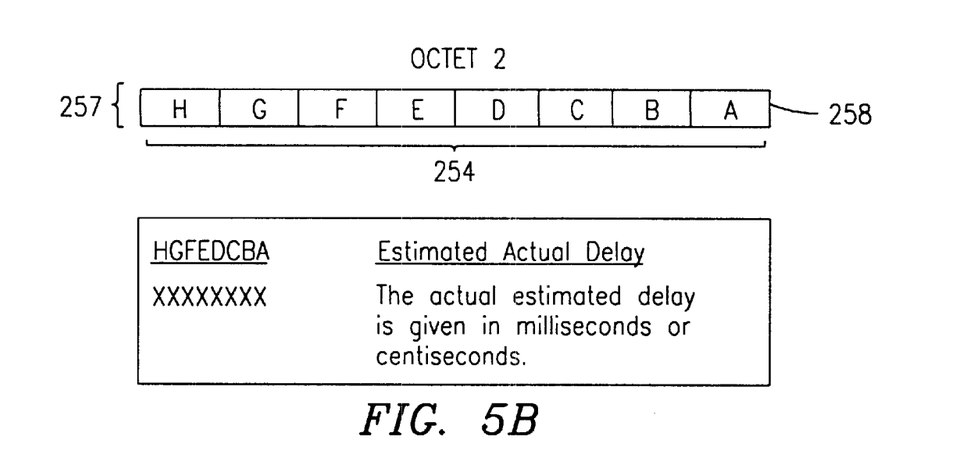

In an alternative embodiment, as shown in FIGS. 5A and 5B of the drawings, the expanded satellite hop counter field 257 can be supplemented with a cumulative delay value 254, instead of the number of satellite hops. The cumulative delay value 254 is a measurement of the estimated in-path delay in milliseconds or centiseconds. Thus, the first octet 255 remains identical to the one described in the satellite hop counter embodiment, in which bit A is the satellite delay indicator 256, which indicates whether satellite delay information is present, and bit B becomes a spare bit. However, in the second octet 258, an actual estimate of. the delay present 254 is given by using as many bits (A–H) as are necessary. For example, if there is one MEO satellite hop and one GEO satellite hop in the connection, the delay estimate 254 would be 317 ms.

Figure 6:
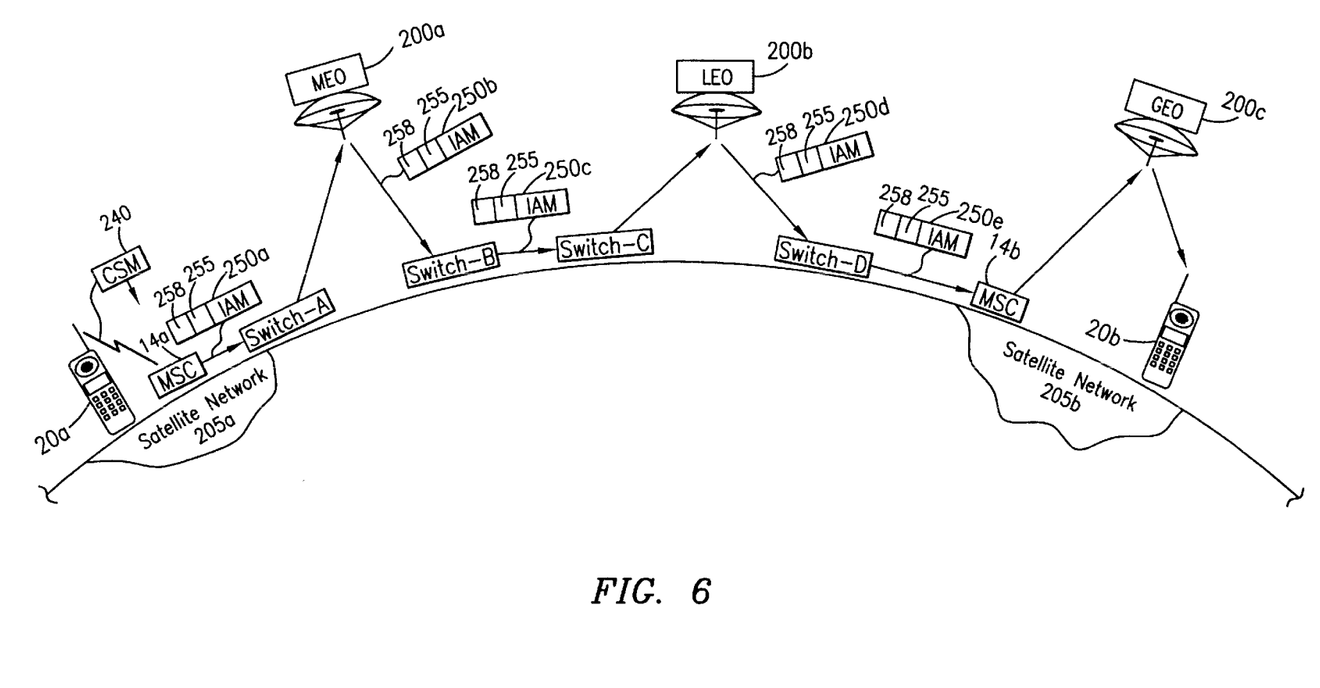
FIG. 6 illustrates a sample call connection process using the information within the expanded satellite hop counter field.
Figure 7:
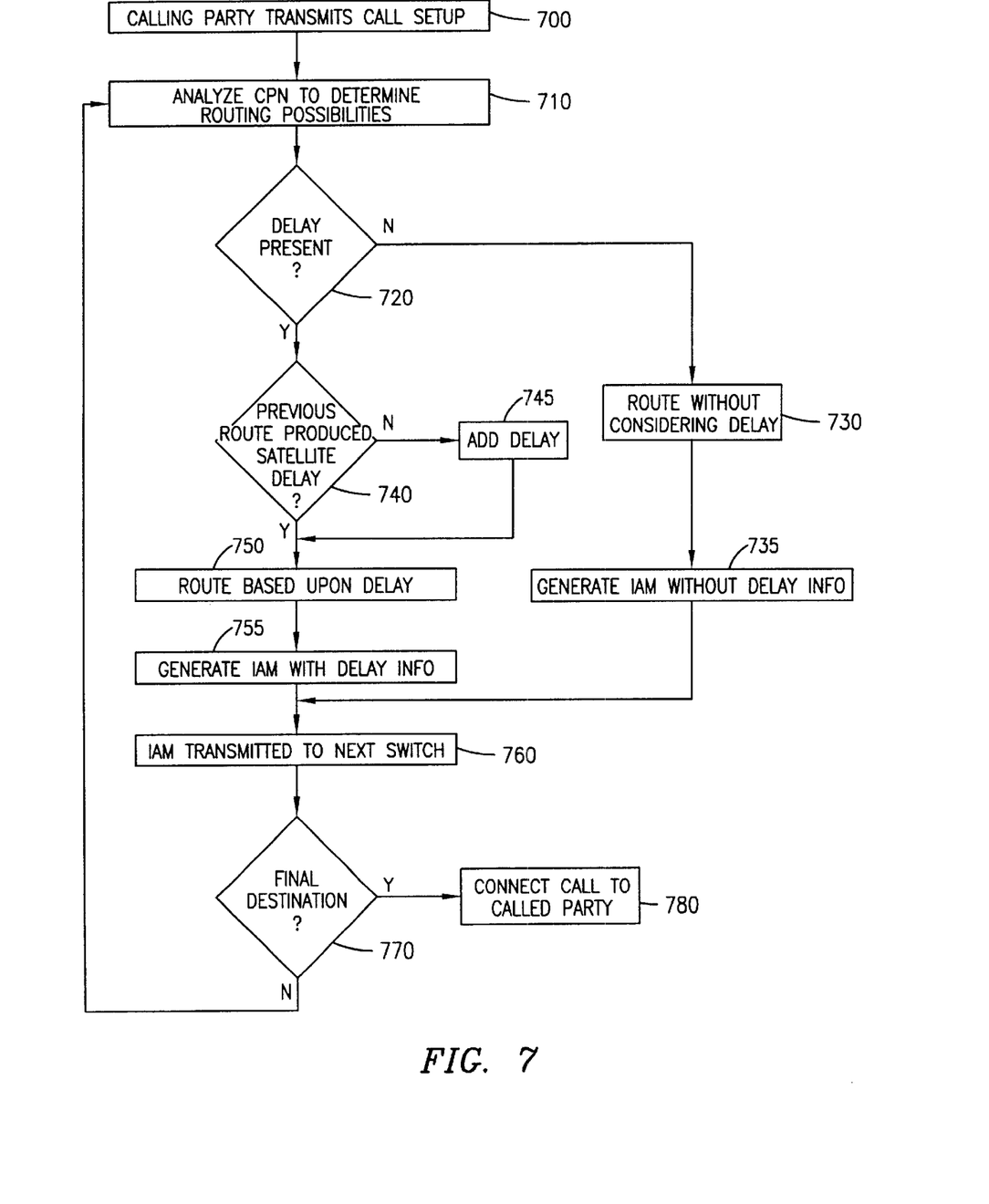
FIG. 7 illustrates the steps for implementing the sample call connection shown in FIG. 6.

With reference now to FIG. 6 of the drawings, which will be described in connection with the steps listed in FIG. 7 of the drawings, a sample call routing process using the new expanded satellite hop counter information is shown. When a calling MS 20a within a satellite network 205 places a call to a called MS 20b, the calling MS 20a transmits a call setup message 240, including a Called Party Number (CPN), to a serving originating Mobile Switching Center (MSC) 14a (step 700). Upon receipt of the call setup message 240, the originating MSC 14a analyzes the CPN, and accesses it's routing tables to identify the circuits (satellite or trunk) to use to route the call with the least number of hops (satellite or trunk) (step 710).

Since there is no delay present at this point in the call (step 720), the originating MSC 14a routes the call without considering the delay (step 730) and generates a first Initial Address Message (IAM) 250a without delay information (step 735). The IAM 250a is the initial ISUP message used in establishing a circuit connection for the call. Since there is no delay, in the first octet 255, as shown in detail in FIGS. 4A and 5A , bit A is set to zero to indicate that no satellite delay information is present. Thereafter, this first IAM 250a is transmitted to Switch-A (step 760), which will provide the first voice connection in the call. In this example, Switch-A is not the final destination for the call (step 760). Instead, Switch-A is simply a tandem, used as an intermediate switch to reach the final destination. Switch-A may be another MSC or a local exchange within the Public Switched Telephone Network (PSTN).

When Switch-A receives the first IAM 250a from the originating MSC 14a, Switch-A analyzes the CPN, and accesses it's routing tables to determine the best path to use to route the call to the final destination (step 710). Since there is no satellite delay information present based upon the information in the first octet 255 and the fact that the previous hop from MSC 14a to Switch-A did not produce any additional delay (step 720), Switch-A can determine the best path without considering the delay (step 730). In this example, Switch-A decides to route the call over a MEO satellite 200a to Switch-B. Therefore, Switch-A generates a second IAM 250b, which does not include delay information (step 735), and transmits this second IAM 250b to Switch-B via the MEO satellite 200a (step 760).

When Switch-B receives the second TAM 250b (step 760), and Switch-B realizes that it is not the final destination (step 770), Switch-B must also analyze the CPN, and access it's routing tables and determine how best to route the call (step 710). Since delay is now present in the call (step 720), and this delay is due to the previous MEO satellite 200a hop (step 740), the MEO satellite 200a hop delay information must be added to the delay information (step 745), and considered when deciding how to route the call (step 750). In this example, Switch-B decides that routing the call over trunk lines to Switch-C would be the most efficient routing method, since there is already some delay present in the call. Therefore, when Switch-B generates a third IAM 250c to Switch-C, this third TAM 250c contains delay information (step 755).

For example, in the first octet 255, bit A (as illustrated in FIGS. 4A and 5A) can be set to one, and the second octet 258 can be generated according to either FIG. 4B or 5B. If the second octet 258 indicates the number of satellite hops, as shown in FIG. 4B, Switch-B sets the MEO field 252 in the second octet 258 to indicate that the number of MEO satellite hops is one. Alternatively, if the second octet 258 indicates the accumulated delay 254, as shown in FIG. 5B, Switch-B sets the second octet 258 to indicate a delay 254 of approximately 67 ms.

Upon receiving the third IAM 250c (step 760), since Switch-C is not the final destination (step 770), Switch-C analyzes the CPN and accesses it's routing tables to determine the routing possibilities (step 710). Switch-C also examines the satellite delay information bit in the first octet 255, and determines that delay is present in the connection (step 720). Thereafter, Switch-C looks for the second octet 258 to determine the amount of delay present. Since the previous hop did not produce any additional delay (step 740), Switch-C only considers the delay indicated in the third IAM 250c to determine how to route the call (step 750). In this example, Switch-C determines that the best routing possibility is to route the call over a LEO satellite 200b to Switch-D. Therefore, Switch-C must generate a fourth IAM 250d that includes the same delay information as that indicated in the third IAM 250c in the second octet 258 (step 755).

When Switch-D receives the fourth IAM 250d (step 760), since Switch-D is not the final destination (step 770), and there is significant delay present in the call (step 720), Switch-D concludes that due to the accumulated delay in the path, the best routing method is to route the call to a destination MSC 14b via trunk lines (step 750). Since the previous hop produced additional delay (step 740), this additional amount is added to the existing delay in the second octet (step 745) prior to choosing the appropriate routing method for the call (step 750). In addition, when generating the fifth IAM 250e, Switch-D includes this additional delay information in the second octet (step 755). For example, for the satellite hop counter octet 258, as shown in FIG. 4B, Switch-D updates the LEO field 251 in second octet 258 to indicate that one LEO satellite hop and maintains the MEO field 252 in the second octet 258 to indicate that one MEO satellite hop has been encountered in the connection. For the actual delay estimate octet 258, the delay value 254 is increased to include the delay not only for the MEO satellite hop, but also for the LEO satellite hop.

When the destination MSC 14b receives the fifth IAM 250e (step 760), the destination MSC 14b realizes that the called MS 20b is located within the area covered by the satellite network 205b associated with the destination MSC 14b (step 770). Thereafter, the destination MSC 14b pages the called MS 20b over, for example, a GEO satellite 200c. When the called MS 20b responds to the page, the destination MSC 14b establishes a call connection between the called MS 20b and the calling MS 20a (step 780). Speech and/or data between the calling MS 20a and called MS 20b are transmitted through the voice circuit connection established between the originating MSC 14a and the destination MSC 14b via Switches A–D and the various trunk and satellite connections.

As will be recognized by those skilled in the art, the innovative concepts described in the present application can be modified and varied over a wide range of applications. Accordingly, the scope of patented subject matter should not be limited to any of the specific exemplary teachings discussed, but is instead defined by the following claims.

What is claimed is:

1. A method for a switch to route a call from a calling party to a called party, comprising the steps of:
   receiving a message having at least a satellite delay indicator therein;
   determining whether said satellite delay indicator indicates a presence of satellite delays;
   if said satellite delay indicator indicates a presence of satellite delays, extracting satellite delay information associated with at least a number of satellite hops for each of a plurality of satellite types for said call from said message;
   determining whether the routing of said call to said switch produced additional satellite delay;
   if so, generating an Initial Address Message having said satellite delay indicator therein set to indicate a presence of satellite delays; and
   including updated delay information within said Initial Address Message, said updated delay information being associated with at least an updated number of satellite hops for each of said plurality of satellite types for said call.

2. The method of claim 1, wherein said step of receiving further comprises the step of:
   receiving an Integrated Services Digital Network User Part message having at least said satellite delay indicator therein.

3. The method of claim 1, wherein said step of receiving further comprises the step of:
   receiving said message having both a first octet containing said satellite delay indicator and a second octet containing said satellite delay information.

4. The method of claim 3, wherein said step of determining further comprises the step of:
   determining that said satellite delay indicator indicates a presence of satellite delays when a bit of said first octet associated with said satellite delay indicator is set to one.

5. The method of claim 3, wherein said step of extracting further comprises the step of:
   determining, from said delay information, a first number of hops via geostationary satellites, a second number of hops via mid-earth orbit satellites and a third number of hops via low-earth orbit satellites involved in said call.

6. The method of claim 5, wherein said step of determining said number of hops further comprises the steps of:
   determining said first number from three bits of said second octet;
   determining said second number from two additional bits of said second octet; and
   determining said third number from three additional bits of said second octet.

7. The method of claim 1, wherein said step of extracting further comprises the step of:
   determining, from said delay information, an estimated actual delay value based upon at least said number of satellite hops for each of said satellite types.

8. A message for identifying satellite delays within a call connection between a calling party and a called party, comprising:
   a satellite delay indicator for indicating a presence of satellite delays; and
   delay information indicating a number of satellite hops for each of a plurality of satellite types in said call connection, said plurality of satellite types including at least geostationary satellites, mid-earth orbit satellites and low-earth orbit satellites.

9. The message of claim 8, wherein said delay information comprises at least a first number of hops via said geostationary satellites, a second number of hops via said mid-earth orbit satellites and a third number of hops via said low-earth orbit satellites involved in said call connection.

10. The message of claim 8, wherein delay information comprises an estimated actual delay value based upon at least said number of satellite hops for said geostationary satellites, said mid-earth orbit satellites and said low-earth orbit satellites.

11. A switch for routing a call between a calling party and a called party, comprising:
   means for receiving a satellite delay indicator indicating a presence of satellite delays and delay information associated with said satellite delay indicator, said delay information indicating a number of satellite hops for each of a plurality of satellite types involved in said call, said plurality of satellite types including at least geostationary satellites, mid-earth orbit satellites and low-earth orbit satellites; and
   means for routing said call in response to said delay information.

12. The switch of claim 11, wherein said delay information comprises at least a first number of hops via said geostationary satellites, a second number of hops via said mid-earth orbit satellites and a third number of hops via said low-earth orbit satellites involved in said call connection.

13. The switch of claim 11, wherein delay information comprises an estimated actual delay value based upon at least said number of satellite hops for said geostationary satellites, said mid-earth orbit satellites and said low-earth orbit satellites.

14. A method for a switch to route a call between a calling party and a called party, comprising the steps of:

receiving a message including a satellite delay indicator indicating a presence of satellite delays and delay information associated with said satellite delay indicator, said delay information indicating a number of satellite hops for each of a plurality of satellite types involved in said call, said plurality of satellite types including at least geostationary satellites, mid-earth orbit satellites and low-earth orbit satellites; and routing said call in response to said delay information.

\* \* \* \* \*

UNITED STATES PATENT AND TRADEMARK OFFICE
CERTIFICATE OF CORRECTION

PATENT NO.    : 6,449,478 B1
DATED         : September 10, 2002
INVENTOR(S)   : Valentine et al.

It is certified that error appears in the above-identified patent and that said Letters Patent is hereby corrected as shown below:

<u>Column 3,</u>
Line 56, replace "satellite.hops" with -- satellite hops --

<u>Column 6,</u>
Line 25, replace "TAM 250b" with -- IAM 250b --
Line 39, replace "TAM 250c" with -- IAM 250c --

Signed and Sealed this

Eighteenth Day of February, 2003

JAMES E. ROGAN
*Director of the United States Patent and Trademark Office*